United States Patent [19]

Staneluis et al.

[11] Patent Number: 4,925,719
[45] Date of Patent: May 15, 1990

[54] REINFORCED POLYMERIC COMPOSITES

[75] Inventors: James M. Staneluis; Donald L. Rodenbeck, both of Bowling Green, Ohio

[73] Assignee: Centrite Corp., Bowling Green, Ohio

[21] Appl. No.: 348,214

[22] Filed: May 5, 1989

Related U.S. Application Data

[63] Continuation-in-part of Ser. No. 179,479, Apr. 8, 1988, Pat. No. 4,828,897.

[51] Int. Cl.⁵ .................. B32B 3/02; B32B 3/26; B32B 5/12
[52] U.S. Cl. .................. 428/71; 428/86; 428/109; 428/113; 428/114; 428/284; 428/285; 428/286; 428/294; 428/295; 428/309.9; 428/317.9
[58] Field of Search .................. 428/71, 86, 109, 113, 428/114, 284, 285, 286, 294, 295, 309.9, 317.9

[56] References Cited

U.S. PATENT DOCUMENTS

| | | | |
|---|---|---|---|
| 2,908,602 | 10/1959 | Collardeau et al. | 428/285 |
| 3,900,650 | 8/1975 | Sedore | 428/86 |
| 3,900,651 | 8/1975 | Hoppe et al. | 428/86 |
| 4,414,265 | 11/1983 | Rosato | 428/285 |
| 4,474,845 | 10/1984 | Hagerman et al. | 428/285 |
| 4,716,072 | 12/1987 | Kim | 428/285 |
| 4,753,837 | 6/1988 | Hanusa | 428/309.9 |
| 4,770,929 | 9/1988 | Nobumasa et al. | 428/285 |

Primary Examiner—William J. Van Balen
Attorney, Agent, or Firm—Peter D. Sachtjen

[57] ABSTRACT

A high strength reinforced composite has an outer polymeric skin and an inner polymeric foam core chemically and mechanically bonded together at a high modulus, three dimensional interface comprising longitudinally continuous strands, transversely continuous and randomly arrayed transverse strands, and randomly inclined short strands having end portions embedded in both the skin and the core.

8 Claims, 3 Drawing Sheets

REINFORCED POLYMERIC COMPOSITES

RELATED APPLICATION

This patent application is a continuation-in-part application of U.S. patent application Ser. No. 179,479 filed on Apr. 8, 1988, now U.S. Pat. No. 4,828,897.

BACKGROUND OF THE INVENTION

The present invention relates to the manufacture of reinforced polymeric articles and, in particular, to continuously molded composites comprising a polyurethane core and polyurethane skin structurally integrated at a three dimensional high modulus interface.

Foamed polyurethane products having integral reinforcements for imparting increased strength to a core have been formed in both batch and continuous processes. For example, in U.S. Pat. Nos. 4,163,824 and 4,073,840, there is disclosed a method and apparatus for producing fiber-reinforced foam articles wherein randomly oriented fiber filaments are dispersed throughout a core. This produces a foamed product of substantially uniform density. Another batch process is disclosed in U.S. Pat. No. 4,130,614 wherein woven glass mats reinforce the top and bottom surfaces of a foamed article with the glass mats captured entirely within a higher density outer foam layer which surrounds a lower density inner core. The major surfaces may include a film layer adhered to the outer foam layer. A similar material is also disclosed in U.S. Pat. No. 3,895,159 wherein a glass fabric is embedded in at least one noncellular surface layer. Continuous processes have been disclosed for the manufacture of foamed articles, particularly laminated foams. For instance, U.S. Pat. Nos. 3,686,047; 4,496,625; 4,555,442; Re. 30,984; 3,142,864; and 3,903,346, disclose continuous foam laminates wherein structural facing sheets of materials such as foils, film, and the like are laminated to the inner foam core during an open-ended forming process.

In the above approaches to reinforcing the foam, certain physical characteristics are improved while others are not. The laminates improve flexure strength and to an extent longitudinal compressive strength in comparison with the foam core alone. However, only an adhesive bond and not a mechanical bond is effected between the foam and the laminate. Accordingly, this presents a relatively weak shear interface, particularly under high cyclical loadings. Such articles are prone to fracturing at the interface with a resultant loss of product integrity. It would be desirable to provide, in view of the foregoing limitations, a reinforced polymeric composite system with improved static and dynamic characteristics as a load bearing member which system provides increased design flexibility within existing thermoset chemistry and can be accurately produced in a continuous process.

BRIEF SUMMARY OF THE INVENTION

The present invention provides reinforced foam composite systems overcoming the aforementioned deficiencies of prior reinforced foam which has broad utilization as a load bearing member for static as well as dynamic applications. In particular, such composite systems out-perform wood or wood substitutes in compressive strength, flexure strength and impact strength.

In its broadest aspect, the invention provides a continuous process for making a reinforced foamed composite by structurally integrating a three dimensional high modulus strand material interface into both an inner and outer polymeric substrate. The process is designed to pull continuous strands or mats through a continuous cavity while placing a coating on the outside surface, a foam core in the interior with an interface comprising high modulus chopped strands and the continuous strands in three dimensional orientation locking the coating with the core. This process makes a reinforced polymeric composite in a continuous process to predetermined cross sectional configurations. Substantial strength in the direction transverse to the longitudingal strands may be provided by continuous cross or transverse strands. As opposed to woven mats which are not comparable tensile bearing members in composite, the continuous cross strands provide uniform strength characteristics in both the longitudinal and transverse directions.

More particularly, the process provides a plurality of continuous molds that traverse a pathway. The molds have opposed surfaces thereon defining an open ended cavity of the predetermined cross sectional configuration. Continuous thin, flexible mold release films are fed cojointly with the molds and overlay the opposed surfaces defining the cavity. A thin coating of a first nonvolatile liquid thermoset polymeric composition, such as a rigid polyurethane, is applied to each of the mold release films on the inwardly facing surfaces thereof. A plurality of continuous glass strands, such as fiberglas, are fed along said pathway cojointly with the mold release films and applied lightly onto each coating. A random array of short chopped high modulus strands, such as fiber glass, are dispersed in transverse layers on the continuous glass, with both the continuous and chopped glass strands being wetted at least partially by both compositions. A second foamable, non-volatile liquid thermoset polymeric composition, such as an isocyanateurethane is dispersed into the space between the inwardly facing surfaces of the strands. The coating quickly sets at an outer skin while the remainder thereof is maintained in a viscous state permitting the coating to wet and penetrate the strands until subsequent to the conforming. Thus the glass is partially wetted by both compositions. As a result, the strands are captured at the interface between the compositions. Sufficient blowing agent is provided in the the second reactant composition for the to at least partially penetrate the strands and to embed ends of the chopped strands in both compositions to form a three dimensional glass network of high modulus which structurally integrates the coating with the core. Where continuous cross or transverse strands are incorporated in the composite, the same are added upstream of chopped glass.

BRIEF DESCRIPTION OF THE DRAWINGS

The above aspects and other benefits and advantages of the present invention will become apparent upon reading the detailed description of the preferred embodiments taken in conjunction with the accompanying drawings in which.

DETAILED DESCRIPTION OF THE PREFERRED EMBODIMENT

Figure 1:
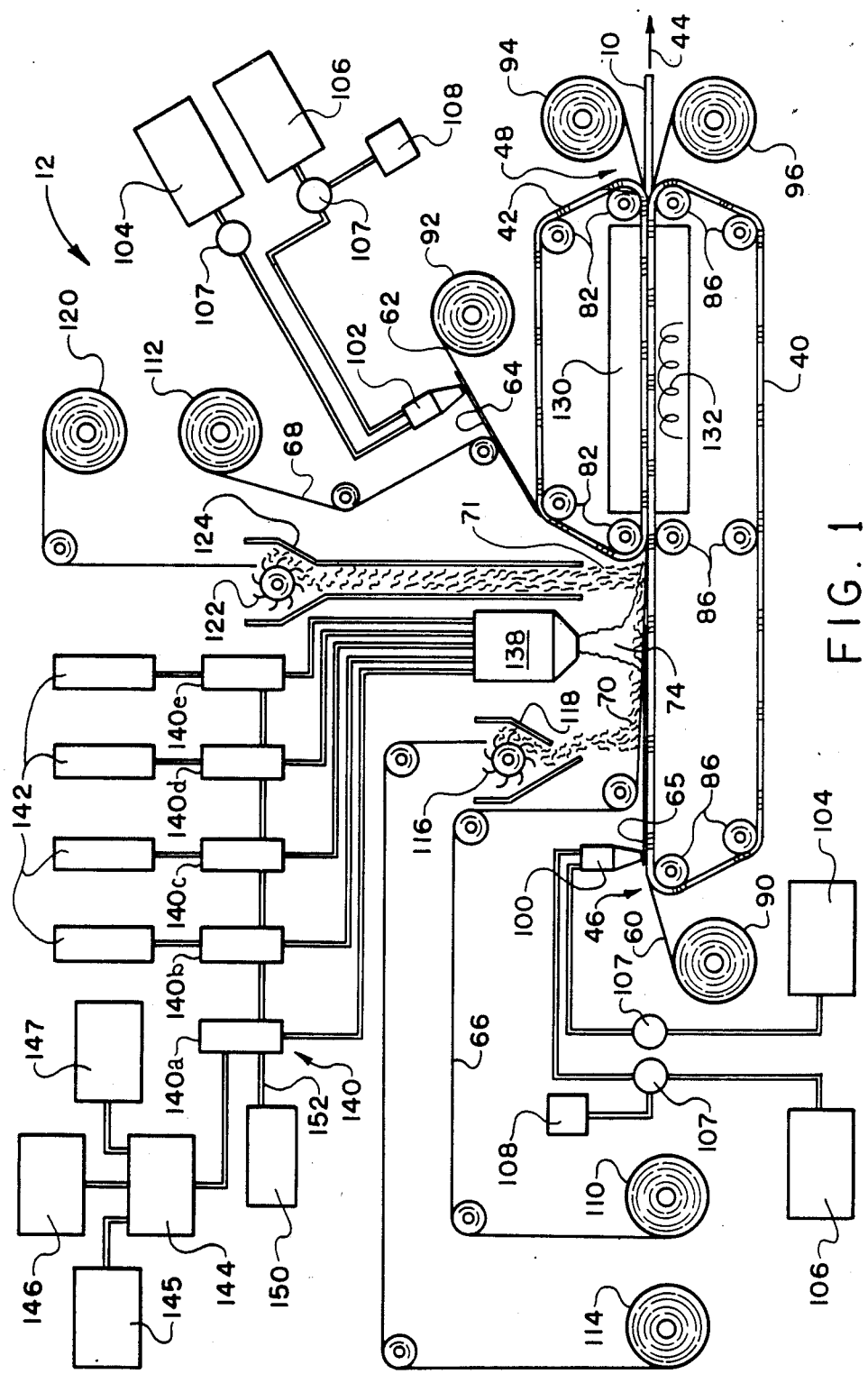
FIG. 1 is a schematic side elevational view of the continuous process for making a reinforced foamed composite according to the present invention.
Figure 2:
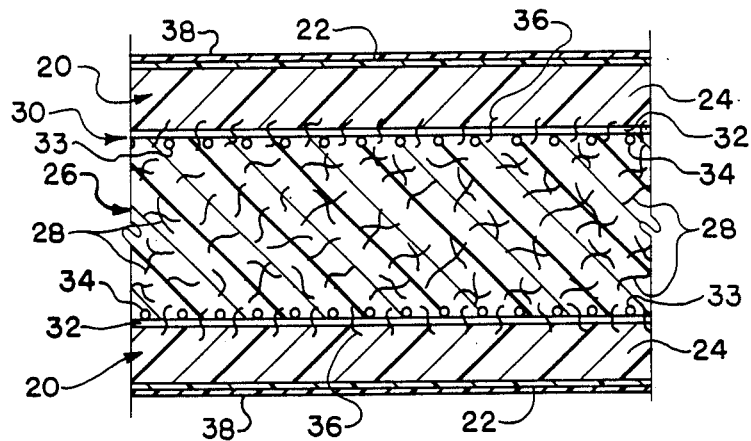
FIG. 2 is a cross sectional view of a composite produced in accordance with the process of FIG. 1.

Referring to the drawings and in particular to FIGS. 1 and 2, there is shown a process for making a reinforced foamed composite 10 in a continuous casting machine, generally indicated by the numeral 12. The composite 10, as illustrated in greater detail in FIG. 2, comprises a molded structure of a skin 20 comprising an outer surface 22 and an inner base 24, an inner core 26 including a random array of high modulus strands 28, and a three dimensional network of high modulus strands, generally indicated by the reference numberal 30, which mechanically and chemically bonds the core 26 to the skin 20 to form a unitary structure. As will be hereinafter described in greater detail, the network 30 comprises continuous strands 32, longitudinally disposed, and a layer of chopped strands 34, disposed randomly transversely, with portions 36 of the strands 34 having ends embedded in both the skin 20 and the core 26.

Figure 5:
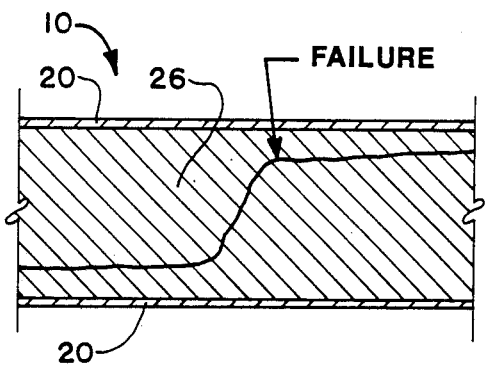
FIG. 5 is a cross sectional representation at composite failure.

The process for making the above described composite 10 is schematically illustrated in FIG. 1. Therein a pair of opposed continuous molds 40, 42 traverse a generally horizontal pathway 44 between an entrance end 46 and an exit end 48. The molds 40, 42, as shown in FIG. 5, have opposed inner surfaces 50 thereon thus defining an elongated open-ended horizontal cavity 52 along the pathway 44 of the predetermined cross sectional configuration. As will become hereinafter apparent, the molds 40, 42 may be configured to define cross sections of desired shape, whether symmetrical or non-symmetrical. Further, the belts 40, 42 may be periodically interrupted to provide composites of predetermined discrete lengths. The process is moreover amenable to making predictably products of desired strength properties in a wide range of configurations through process control involving composition, density, thickness, width, elastic modulus, and skin thickness as will he exemplified in greater detail below.

A pair of continuous thin, flexible mold release films 60, 62 are fed cojointly with the molds 40, 42 and overlie the opposed inner surfaces 50 defining the cavity 52. A thin upper coating 64 and lower coating 65 is applied to each of the mold release film 60, 62, respectively, on the inwardly facing surfaces thereof. A plurality of high modulus continuous longitudinal strands 66, 68 are fed longitudinally along said pathway 44 cojointly with the films 60, 62 and onto the coating 64. The continuous glass strands 66, 68 are lightly tensioned so as to be partially wetted by the coating 64. A random array of high modulus, chopped strands 70, 71 are dispersed in layers on the continuous glass strands 66, 68, respectively, downstream of the coating 64. A formable core 74 is dispersed in the space between the inwardly facing surfaces of the layers of chopped glass strands 70, 71. In the described embodiment, the skin 2 is a high density urethane and the core 74 is a urethane formulation comprising a polyol, a catalyst system, a filler and a blowing agent, in sufficient proportions to effect a foam matrix of sufficient volume to conform the films 60, 62 to the configuration of the opposed surfaces 50, 51 of the molds 40, 42. The strands are monofilament fiber glass.

In a modification of the thus far described composite and process, a plurality of high modulus continuous transverse strands 69a, 69b may also be fed longitudinally along said pathway 44, immediately downstream of the strands 66, 68, cojointly with the films 60, 62 and onto the coating 64. A composite incorporating the transverse strands differs from the aforementioned composite in the addition of a longitudinal array of continuous cross or transverse strands extending transversely of the composite in abutting relation with the continuous longitudinal strands. These transverse strands also form a part of the three dimensional network 30 of high modulus strands. In this case, the composite 10 comprises a molded structure of the skin 20 comprising the outer surface 22 and inner base 24, and inner core 26 including a random array of high modulus continuous longitudinal strands 28, and the three dimensional network 30, which mechanically and chemically bonds the core 26 to the skin 20 to form a unitary structure. The network 30 comprises the longitudinal strands 32, the transverse strands 33, and the layer of chopped strands 34 disposed randomly transversely with the strands 33. Portions 36 of the strands 34 have ends embedded in both the skin 20 and the core 26.

Examples of polymers suitable for the coating and the core are polyurethanes, polyesters, polyamides, epoxies, acrylics, silicones, phenolics and other like non-volatile liquid monomers. Examples of high modulus strands are fiber glass, carbon fibers and other strand material having a high elastic modulus. The strands are preferably conventionally coated to promote adhesion between the strands and the substrates. Suitable fillers include calcium carbonate, alumina trihydrate, mica, calcium sulfate, talc, calcium silicate, silica and other like, relatively inexpensive organic and inorganic materials.

More particularly, the machine 12 manufactures the composite 10 in continuous lengths to the cross section prescribed by the configuration of the molds 40, 42. Adjacent the exit end 48 of the machine 12, the composite 10 may be severed to desired length by a suitable cutting apparatus, such as a shear or saw, synchronized to the belt speed. The cutting apparatus may be manually or automatically controlled to sever the composite 10 on a continuous basis to constant or variable lengths.

Figure 3:
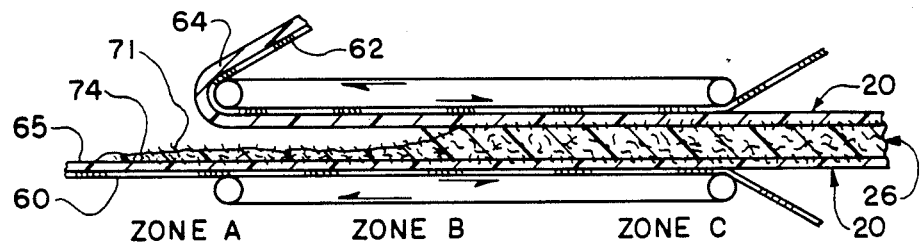
FIG. 3 is a schematic view of the process illustrated in FIG. 1 showing the various reaction zones therein.

The process 12, as shown in FIG. 3, comprises three basic reaction zones, each of which is critical to the integrity of the resultant product: Zone A Wherein the components are delivered and initial reactions proceed: Zone B wherein the subsequent chemical reactions proceed; and Zone C wherein the composite is cured.

Figure 4:
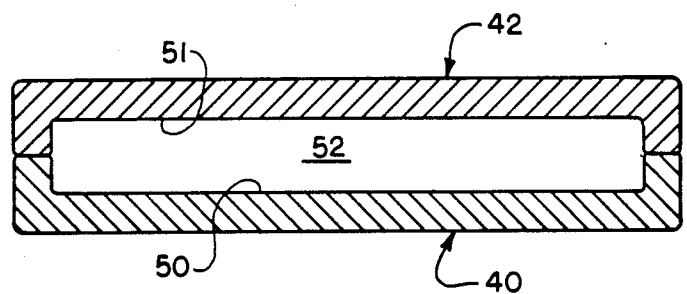
FIG. 4 is a transverse cross sectional view of the mold segments for the composite.

The continuous molds 40, 42 in the preferred embodiment comprise continuous tracks of pivotally interconnected segments. Referring to FIG. 4, the individual segments are each machined at the inner surfaces 50, 51 for the desired configuration. The upper mold 42 is rotatably supported by rollers 82. The lower mold 40 is similarly rotatably supported by rollers 86. The upper mold 42 is generally coextensive with Zone B and Zone C. The lower mold 40 is generally coextensive with Zones A through C. The molds 40, 42 abut in Zone B and zone C to establish the open ended molding cavity 52 between the entrance and 46 and the exit end 48. The molds 40, 42 may be hydraulically or mechanically biased to maintain closure under the foaming pressures experienced in the process.

The molds 40, 42 are connected to conventional electrical drive and control units, not shown, to cojointly drive the molds at the same, but adjustable, speed. Preferably and as will become apparent below, the speed of the belts can be variably controlled in a conventional manner by the drive units to control the process in conjunction with varying the components and attendant process conditions.

The inner surfaces of the molds 40, 42 are isolated from the composite reactant components by the mold release films 60, 62. The lower mold release film 60 is rotatably supported in a supply roll 90 adjacent the entry roller 86 for the lower mold belt 40. The upper mold release film 62 is rotatably supported in a supply roll 92 above the upper mold belt 42 and downstream of the entrance roller 82 therefor. The mold release films 60, 62 are driven through the process apparatus by the molds 40, 42 under the clamping loading of the abutting mold sections. The upper mold release film 62 is stripped from the molded composite at an take-up roll 94 located adjacent the exit end 48 of the molding cavity 52. The lower mold release film 60 is stripped from the molded composite at a lower take-up roll 96 located adjacent the exit end of the molding cavity 52.

In a commercial embodiment of the process 12, the molds 40, 42 are comprised of a continuous chain of hingedly interconnecting mold segments. Inasmuch as the interface of the segments define a transverse parting line, the mold release films 60, 62 present barrier to the outflow of reactants thereby significantly eliminating transverse flashing. As the films are not required for composite strength, they are non-adherent to both the composite and the molds, so as to be readily removable at the exit end. A polyetheylene film is used in the described embodiment. However, it will be appreciated that for decorative purposes or improved strength the films may be, adherent to the composite 10 thereby eliminating the need for the removal thereof.

It will also be appreciated that the molds 40, 42 can be continuous pieces, in the form of a belt, having integrally formed mold cavity surfaces. For instance, extruded flexible materials may be joined end to end to form a belt of the desired length and configuration. It will also be appreciated that such a belt may overlie all or a portion of the segments.

The coating 20 is a two component thermoset formulation and is applied to the lower mold release film 60 adjacent the lower supply roll 90 at dispensing head 100 and to the upper mold release film 62 adjacent the upper supply roll 92 at dispensing head 102. The skin 20, depending on the desired composite characteristics may be either rigid or foam. The coating components are delivered to the dispensing heads 100, 102 from supply tanks 104, 106 through supply lines by positive displacement pumps, thereby providing a metered and variable component supply in accordance with the composite specifications. An additive may be blended at the pumps 107 from supply tanks 108.

The lower continuous glass strands 66 are applied on the lower coating 65 in bundles from a plurality of spools 110, remotely located and collectively illustrated, at a location immediately downstream of the lower dispensing head 100. The upper continuous glass strands 68 are applied on the upper coating 64 in bundles from a plurality of spools 112, remotely located and collectively illustrated, at a location immediately downstream of the upper dispensing head 102.

Representative of suitable continuous strand material is Product No. 625-11, R099 from CertainTeed Corp. supplied in the form of rovings at 250 yards per pound.

The lower layer of chopped glass strands 70 are supplied in bundles from spools 114, located remote from the process. The bundles proceed through a chopping device 116 for delivery directly in random array onto the lower coating 65 through a vertical chute 118. The upper layer of chopped glass strands 71 are supplied from spools 120 in bundles, also located remote from the process, and proceed through a chopping device 122 for delivery directly in random array onto the upper surface of the core 74 through a vertical chute 124. More particularly, continuous glass strand bundles are fed to the chopping devices for gravity flow though the chutes in randomly arrayed transverse orientation. The chopping devices are effective to sever the the strands into discrete lengths of about 1 inch to about 2.5. This length range substantially contributes to core strength in comparison with the shorter length of glass, 1 inch or under. In this connection, it has been observed that as little 75% less glass is required to provide comparable core strength. The gravity flow of the chopped glass onto the lower coating 65 and onto the upper surface of the core 26 improves the three dimensional orientation thereof in the structural interface between the core and the coating.

Representative of suitable chopped glass strand material is Product No. 290 from CertainTeed Corp. supplied in the form of continuous strand rovings at 207 yards per pound. The density of the layers of chopped glass strands 70, 71 is controlled between 0.02 lb/S.F. and 0.08 lb/S.F., preferably around 0.04 lb/S.F., to minimize the overlapping and resultant buildup thereof. In other words, if too much chopped strand is deposited, the chopped glass is not completely wetted by the reactants. As a result thereof under loading and particularly cyclic loading, delamination can readily occur between the coating 20 and the core 26. On the other hand, if too little chopped material is deposited, the core 26 is interspersed with the coating 20, when the core foams or blows, the chopped strands separate and too readily pushes to the outer surface of the composite 10. In addition to producing a weak board, the same is also cosmetically unacceptable. Moreover and as will be described in greater detail below, portions of the chopped strands pivot from the transverse plane such that the ends thereof are embedded in the coating as well as the core. This forms the three dimensional network 30 thereby significantly increasing the composite strength. More particularly, inasmuch as the chopped glass is randomly dispersed, some strands are inclined with respect to the continuous glass, while others are captured in the continuous glass and turned upwardly by the foaming action. Some strands are carried partially into the core 26 by the rising action of the foam and pressed into the coating 22 as it wets the continuous glass.

It will also be appreciated that if a discrete preformed component such as a mat or felt is used for the outer surface of the composite 10, the chopped glass will nonetheless serve to maintain the separation of the coating and the core. Inasmuch as the flexure strength of a coating and core composite depends on the elastic modulus of the coating and its thickness, keeping the low density core out of the coating maixmizes the modulus thereof.

The continuous strands 66, 68 are lightly tensioned by means of tensioning rollers, not shown, sufficient to wet the strands on the surface exposed to the coating but insufficient to cause extrusion of the coating material therethough or an embedding of a significant portion in the coating.

The molds 40, 42 in Zones B and C are surrounded by an enclosure 130. The interior of the enclosure 130 is heated or cooled by means of a coiled heating and/or cooling element 132, schematically illustrated. This temperature control permits the molds to be are heated and maintained at a temperature for controlling the date at which the coating sets for the purposes hereinafter described.

With particular reference to the process, as generally described above, the films 60, 62 are non-adherent to both the mold and the coating. For a rigid thermoset coating and steel molds and a process operating temperature of between 150–160 degrees F, it is preferred to use as a film and mold liner a low density polyethylene film. If higher reaction temperatures are experienced in the process a higher meting point film may be selected. Moreover if a film, for decorative or strength considerations, is desired as a laminate, it must be adherent to the coating while obviously non-adherent to the molds. The coating is preferably a high density non-volatile liquid thermoset polymer together with minor amounts of a surfactant, and pigment. For a foam coating, a filler may be added together with the above reactants. These component formulations and their associated reactions are well known in the art. Polyurethance and polyester formulations are exemplified in Table I below.

TABLE I

TYPICAL COATING FORMULATIONS
(parts by weight)

| 1. Polyurethane Component | Rigid | Foam |
| --- | --- | --- |
| A Polyol | 100.0 | 100.0 |
| B Isocyanate | 101.2 | 101.2 |
| C Surfactant | 0.011 | .011 |
| D Filler | 0.0 | 100.0 |
| E Catalyst | 0.0007 | 0.0009 |

A-Pluracol No. 975 polyol manufactured by BASF
B-Item #M20S manufactured by BASF
C-Item #DC-193 manufactured by Dow
D-Aluminum Trihydrate manufactured by AluChem, Inc.
E-Item #T-12 manufactured by Air Products

| 2. Polyester Component | Rigid |
| --- | --- |
| A Polyester resin | 100.0 |
| B Catalyst 1 | 1.0 |
| C Pigment 1 | 1.0 |
| D Pigment 2 | 10.0 |
| E Filler 1 | 30.0 |
| F Filler 2 | 30.0 |
| G Catalyst 2 | 2.0 |

A-Aropol 8438 manufactured by Ashland Chemical
B-Cobalt octoate manufactured by Burton Plastics
C-Titanium dioxide
D-Carbon black
E-Calcium carbonate
F-Alumina trihydrate
G-M.E.K. peroxide, Lupersol DHD-9 manufactured by Lucidol Pennwalt Chemicals The core is a foaming system of a well-known type comprising thermoset polymers of the type used in the coating with surfactants, blowing agents and a catalyst system. A typical core formulation for a polyurethane and a polyester formulation, in parts by weight, in accordance with the process described above is shown in Table II below.

TABLE II

| Typical Core Formulation | |
| --- | --- |
| 1. Polyurethane Component | Parts |
| A Polyol | 105.6 |
| B Filler | 100.0 |
| C Surfactant | .01 |
| D Blowing Agent | .005 |
| E Catalyst 1 | .001 |
| F Catalyst 2 | .016 |
| G Catalyst 3 | .05 |
| H Isocyanate | 116.2 |

A-Pluracol No. 975 manufactured by BASF
B-Alumina trihydrate manufactured by Aluchem Inc.
C-Item DC-193 manufactured by Dow
D-Water
E-Item .T-]7 manufactured by Air Products
F-Item 8154 manufactured by Air Products
G-Item 8020 manufactured by Air Products
H-PAPI 27 maunfactured by Dow

| 2. Polyester Component | Parts |
| --- | --- |
| A Polyester resin | 100.0 |
| B Blowing Agent | 1.5 |
| C Catalyst 1 | 10.0 |
| D Filler | 50.0 |
| E Catalyst 2 | 1.5 |

A-Ampol No. 8438 manufactured by Ashland Chemical
B-Luperfoam Q 6920A manufactured by Lucidol Pennwalt Chemicals
C-Cobalt napthanate
D-Alumina trihydrate
E-M.E.K. peroxide, Lupersol DHD-9 manufactured by Lucidol Pennwalt Chemicals With reference to polyurethane formulations, the core components are supplied to a mixing head 138, located upstream of the entry end of the cavity, from through supply lines from a bank of five positive displacement meters 140. Four of the five meters 140 are fed by the supply lines from reservoirs 142. The reservoirs 142 may contain a single component or a mixture thereof. The other meter 140 is supplied from a premix reservoir 144 from supply tanks 145, 146, 147 respectively containing a polyol, filler and catalyst.

To enable this dynamic control, the positive displacement meters are used and provide the capability to make very small adjustments in the catalyst and water ratios. All of the meters are hydraulically driven by a motor 150, timed together by a common spline shaft 152, such that the ratios of the metered components remain the same, thereby delivering a flow to match belt speed. An example of metering pumps suitable for use in the process are disclosed in U.S. Pat. Nos. 3,920,223 and 4,339,233.

In addition to the blowing agents, surfactants, fillers, and catalysts employed, other components such as fire retardants and pigments may be added at the mixing head 138.

FIG. 1 illustrates five meters delivering to the mixing head. These are the positive displacement type referred to above and driven by a common motor and shaft. The stroke of each may be changed during operation of the process. This stroke adjustment allows control of a discrete meter. Thus the chemical ratios may be changed without affecting the delivery rate.

For the formulation shown in Table II, meter 140a is a premixed formula containing polyol, filler, surfactant and catalyst are delivered to the mixing head. Meter 140b supplies a mixture of water and polyol for blowing the foam. Meter 140c delivers a flowing catalyst. The other meters may be used for delivering any other desired additives. The individual meters permit easy cleaning and individual component control for the entire system.

For the typical polyurethane formulation, the ratios are 100 parts at meter 140a, 3 parts at meter 140b and 2.7 parts at meter 140c. These meters are calibrated and the mixes are scaled to deliver the active ingredient in correct proportion to the formulation. The meters are scaled to maintain the concentration of the active ingredients in the polyol mixture so that the delivery rate of the active ingredient is about 50% of the total at the meter.

It is particularly important to dynamically compute the isocyanate required per 100 parts of each meter mix using the hydroxal numbers for the components of the specific mix. Using a calibration curve plus the direct volume read out the isocynate stroke on each meter is adjusted to the desired ratio.

With the above typical formulations and variations therefrom, a wide range of products can be manufactured with cores having densities from 1 lb/c.f. to 160/lb/c.f. and coatings with densities up to 250 lb/c.f. Based on the aforementioned typical preferred formulation for a rigid coating with foam core, a ¾ in. composite would have the following specifications as shown in Table III.

TABLE III

TYPICAL SPECIFICATIONS

| Layer | Weight (lb/sf) | Thick (in) | S.G. | Wgt (%) | Vol (%) |
|---|---|---|---|---|---|
| Top |  |  |  |  |  |
| Coating | .26 | .04 | 1.2 | 11.8 | 5.3 |
| Strands | .14 | .01 | 2.5 | 6.4 | 1.3 |
| Chopped | .05 | .005 | 2.5 | 2.3 | .07 |
| Core | 1.3 | .64 | 0.4 | 59.0 | 86.66 |
| Bottom |  |  |  |  |  |
| Chopped | .05 | .005 | 2.5 | 2.3 | .07 |
| Strands | .14 | .01 | 2.5 | 6.4 | 1.3 |
| Coating | .26 | .04 | 1.2 | 11.8 | 5.3 |

Densities; Skin, 112 lb/c.f.
Core, 25 lb/c.f.

With particular regard to flexure strength, it will be appreciated that the continuous strands 66, 68, being undirectional, contribute to the elastic modulus only in the longitudinal direction. The chopped strands 70, 71 produce primarily strength in the transverse or cross web direction as well as interlinking the coating 20 to the core 26. This results in a composite of significantly increased flexure strength.

For example, without the chopped glass, the modulus of a ¾ inch board is equal to the core or about 70,000 psi for a typical 25 lb/c.f. material. However with the addition of chopped glass interface, the flexure modulus normally exceeds 1,500,000 psi for a deposit level of 0.08 lb/s.f. A cross strand directional mat applied with the longitudinal continuous glass strands provides elastic modulus in the transverse board direction.

Depositing the chopped glass between and in both the skin 20 and the core 26 substantially strengthens the chemical and mechanical bond between the skin 20 and the core 26. The strands which are embedded at one end in the core 26 and at the other end in the coating 20 are effective in maintaining integrity during cyclical loading. This effect is illustrated in FIG. 5 more clearly. During deflection, there is a shear force at the interface of the skin and the core which acts to separate the skin as demonstrated by the mode of failure in the composite. More particularly, the composite fails by shearing the core with a resulting delamination of the skin from the core. Such failure occurs when the strain due to deflection reaches some critical level in the core. This demonstrates that the modulus of the coating and the network is so high that the core will break in shear before the coating will fail.

During flexure, the top of the composite 10 is in compression while the bottom is in tension. During compression, the chopped glass functions as an array of high strength bridgings to restrain the separation of the high strength coating from the lower strength, low density core. This is shown in the comparative cases in Table IV, below:

TABLE IV

FLEXURAL STRENGTH OF COMPOSITES

| Case No. | Flexure Modulus (psi) | Thick (in) | Density (lb/cf) | Strain (in) |
|---|---|---|---|---|
| 1. Core only | 110,000 | 1.0 | 30 | 0.0054 |
| 2. Mat and chopped core | 150,000 | 1.0 | 30 | 0.0074 |
| 3. Composite | 1,700,000 | 1.0 | 30 | 0.0104 |

Case 1 is a 65% filled urethane core blown 4.2 times to form a homogeneous part.

Case 2 is the same as Case 1 with the addition of a fiberglass matt with 3/16 in. openings pressed into the surface of the core by the blowing action in the mold.

Case 3 is the same as Case 1 with the chopped glass core and a high density skin with a three dimensional interface formed by continuous glass and chopped glass.

All tests were run on 9 inch centers using a molded part 4 inch by 12 inch by 1 inch.

With reference to the glass mat of Case 2, it will be noted that the modulus is increased over the plain core of Case 1. In this instance the part failed when the strain at the interface between the skin and the core reached the critical value of the compression strength for the tested density. The strain at failure for a 65% calcium carbonate filled urethane ranges from 0.006 for a density of 83 lb/c.f. to 0.004 for a density of 25 lb/c.f., with a 30 lb/c.f. having a strain of 0.005 in.

It will be noted that the mat improves the property of the foam core and contributes to an increase in the strain at failure. At a strain of 0.0074 at the outer surface of the coating, the part failed with a crack in the core resulting in a delamination. In this test the coating was visually ascertained to be approximately 0.125 inch. This correlates quite closely with a theoretical calculation, determined as set forth below, of 0.102 inch. It also demonstrates that the chopped glass on the outside of the core forms a composite network of skin on a core, in view of the predicted core failure at 0.0059 inch.

In Case 3, the coating was a urethane coating applied in the aforementioned manner to the outside of the continuous and chopped glass strands. The coating penetrated the strand and chopped glass. However, the coating remained substantially separated from the core by the glass interface. This produced a hard, rigid skin bonded to the core by the bridging of the chopped glass strands.

Case 3 failed in the same mode as Case 2, i.e. shear failure of the core with a resultant delamination of the coating. Visual inspection indicated that the outer layer of the composite comprised the coating, strand glass embedded in the coating with chopped glass embedded in the inner surface thereof. However the delamination was not as clearly defined as in Case 2 demonstrating that the chopped glass reinforced the interface. In case 3 the core failure resulted toward the outer surface of the core in the vicinity of an area where the chopped glass had lesser bridging networking with the skin, the location whereat the critical value appears to have occurred.

Placing all of the chopped glass in the core instead of bridging the core and the skin increases the flexure properties somewhat as indicated by the results of Case 1 versus Case 2. In both cases, however, cracks were easily formed in the skin. This results because the skin is weak in the cross strand direction, in the case of strand glass, and was broken by the core in the case where the mat was used. Accordingly, if all the chopped glass remains in the skin, the strength of the skin perpendicular to the strand glass is enhanced but the interface between the skin and the core is weaker. Therefore, a part under flexure fails at a lower loading because the skin is only held on by the adhesion of the foam to the skin. This is particularly important with respect to the top surface of the composite which is in compression during flexure.

The above results lend themselves to equations which can be used to design and predict flexure performance of products made in accordance with the invention, particularly with respect to longer spans. For shorter spans, an additional equation may be required to account for deflection due to shear. To demonstrate the applicability of the equations set forth below, two samples were prepared for flexure testing. In each the density of the core material was 24 lb/s.f., equivalent to a core blow of 4.2 times. A urethane coating was applied to the outside of the core at a rate of 0.26 lb/s.f. on top of 64 strands of glass, $10 \times 10^6$ psi modulus, at a coating thickness of 0.05 inches. The integral bridge bond between the chopped glass and the skin severed at an applied rate of 0.04 lb/s.f.

Figure 6:
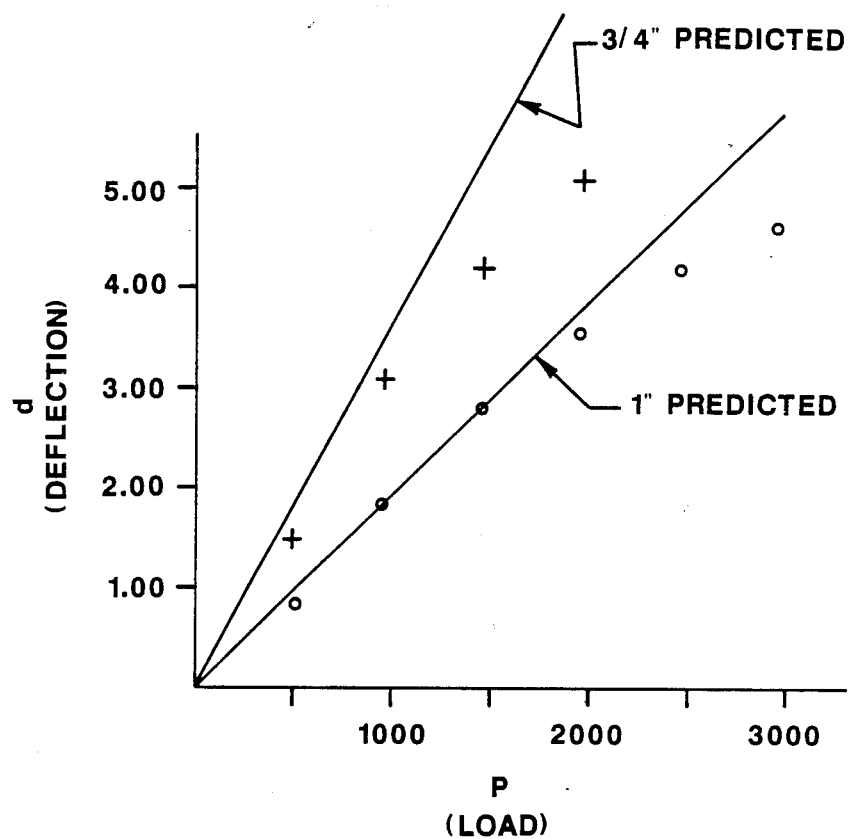
FIG. 6 is a graph relating deflection versus load for actual and predicted composites.

The first part was $\frac{3}{4} \times 12$ inch in configuration. The second part was $1 \times 12$ inch. The parts were flexure tested by loading at mid-span and supported on 48 inch centers. This support length was selected to insure that only flexure, and not shear, was the mode of failure. The graphic results of the test are shown in FIG. 6.

On the basis of these results, the flexure strength can be predicted from two equations:

$$d = \frac{e(L)^2}{6t} \quad (1)$$

wherein d is the critical deflection of the core, in inches; e is the critical strain in the core where failure begins on the outermost surface of the core; t is the core thickness, in inches; and L is the distance of the spans, in inches. (This equation is applicable for single point loading and span as indicated by a comparison of the test and calculated values.)

$$d = P \times \frac{1}{24} \times \frac{L^2}{hb} \times \frac{1}{E_s t_s} \quad (2)$$

wherein d is the critical deflection of the composite, in inches; P is the load at midspan, in pounds; h is the thickness of the composite, in inches; b is the width of the composite, in inches; E is the modulus of elasticity of the skin, in psi; and t is the thickness of the skin, in inches.

These results show that the load and deflection are linerally related from zero to the critical deflection whereat the core cracks. Because of the chopped glass interlocking between the core and the skin, the deflection continues until the load is sufficient to cause delamination. The foregoing results and the sensitivity of parameters indicate that reproducibility of the products can be predicated on process control of: thickness of part, skin, core; part width, core and skin density; and composition.

The bidirectional strength of the composite may also be increased as described above by incorporating transverse or cross continuous strands in the composite. The cross continuous strands abut the longitudinal strands and are located at the interface and interlocked with the bridging of the chopped glass. Preferably the cross strands are manufactured from parallel strands of glass roving which are held together by a fine woven cross thread thereby providing unidirectional fibrous glass reinforcement in the warp direction. A suitable such roving is available from Fiber Glass Industries, Inc. under the Foresil brand. The cross strands are applied at rates comparable to the longitudinal strands.

The contributions of such cross strands to birectional flexure strength was demonstrated in the following tests. Seven sample composites were prepared with different combinations of structural components. Sample sizes were 4 inch by 4 inch by $\frac{3}{4}$ inch. The samples were placed under the three point loading and the weight for $\frac{1}{4}$ inch deflection noted. The results are detailed in Table V.

TABLE 3

| No. | Component | | | | | Load | |
|---|---|---|---|---|---|---|---|
| | A | B | C | D | E | Y | X |
| 1. | x | — | — | — | — | 240 | 240 |
| 2. | x | x | — | — | — | 480 | 480 |
| 3. | x | x | x | — | — | 590 | 590 |
| 4. | x | x | x | x | — | 760 | 1200 |
| 5. | x | x | — | — | x | 1080 | 480 |
| 6. | x | x | x | — | x | 1200 | 760 |
| 7. | x | x | x | x | x | 1370 | 1370 |

A. Core
B. Coating
C. Chopped glass
D. Continuous glass in X direction
E. Continuous glass in Y direction From the foregoing it will be apparent that glass in the Y or transverse direction provides a substantial increase in the transverse flexural strength and and in combination with the core, coating, chopped glass and longitudinal glass provides uniform strength characteristics in both directions.

Operation of the Process

For the typical formulations described above as practiced in the illustrated apparatus and with reference thereto, initially the drive units are energized to drive the belts 40, 42 through the enclosure 130. Sufficient hydraulic pressure is applied to the molds to maintain closure under the foaming pressures. The speed of the molds is controlled to keep the mold fill rate constant as the drive power pulls the molded composite continuously down the line toward the exit end 48.

The element 132 is energized to supply heat sufficient to preheat the molds to around 150-160 degrees F. The mold temperatures are tightly controlled to provide the optimum temperature for developing the desired skin surface without melting the plastic film. As the coating 74 enters at 120 degrees F. or below, a temperature in the above range causes the skin to form immediately at the film-coating interface. As the composite 10 proceeds downstream, the molds transfer heat to the coating 64, causing the reaction to proceed to completion. If the core 74 blows before the coating forms a skin, it will force the glass, continuous and chopped, outwardly into the coating causing a breakup of the skin. This results in a part with surface defects and lowered physical properties.

In this connection, it is important that the coating wet the glass as it moves into the enclosure 130. The bottom strand glass is wetted before it enters the machine. The top glass is wetted when the weight of the core material forces the strand glass into the coating.

Once the coating has set a skin, the core may commence rising. As mentioned above, too much blow or too little blow is critical for dimensional stability. This exothermic reaction is effective to raise the mold cavity temperatures to cause skinning of the coating within Zone A as shown in FIG. 3. Throughout the process, heating and cooling is supplied to maintain these conditions. Inasmuch as the reactions are exothermic, cooling is required under certain operating conditions. Under steady state operating conditions, a temperature range of 155-160 degrees F is preferred with an exiting core temperature of about 170-180 degrees F. Through suitable instrumentation, mold temperature monitoring and exit temperature monitoring provide substantial indication that the reactions are proceeding on schedule. Unless temperatures are maintained in this range, product integrity suffers as reflected in poor quality composite evidenced by holes in the coating, blow holes in the core, and lack of full core filling, particularly in the lower temperatures. Drops in the temperatures beyond those briefly experienced at process start-up are indications of variations in chemistry and mechanical operation. As mentioned above, the upper range represents the melting point of the film and if exceeded may cause adhesion to the product or the mold.

Further, unless the mold temperature is maintained, the critical reactions of the core and coating will not balance. For instance, if the coating sets prematurely before the core completes its blow, the exterior coating will not conform to the mold configuration. Conversely, if the coating is allowed to go uncured until the core completes its blow, the coating will separate permitting intrusion of the core. This lowers the strength and impairs the cosmetic appearance of the coating exterior surface.

As shown in FIG. 3, at the entrance end of the apparatus, the coatings 64,65 are applied directly to the polyethylene mold liner films 60, 62. The thickness of the coating is determined by the speed of the belts 40, 42 and the delivery rate of the coating material. At this point the coating has a viscosity in the range of 2,000 to 10,000 centipores, which may be controlled at the supply tank or at the supply lines by indirect heating methods.

The mold release film is at room temperature, such that the combination of the film and the coating enters the machine at a preferred temperature of around 100 degrees F. Once the film and the coating contact the heated molds, the temperature thereof rapidly increases and self skinning commences with a consequent rapid rise in the coating viscosity. After application of both coatings, the continuous strands and/or mats of fiberglass are applied to the coatings and the chopped glass is deposited on the lower coating and the upper surface of the foam. As discussed above, the glass is not allowed to penetrate the coating layer until the skinning has begun.

The core 74 is applied onto the glass after the coating. This preform enters the molds 40,42 at a line speed of around 20 ft/min. and the core begins to blow at 12-15 seconds in Zone A. The blow is completed at 40-50 seconds in Zone B. The blowing causes the wetting of the fiberglass by both reactant compositions and an incorporation of the reinforcement at the interface therebetween.

It will be appreciated that the concentration and type of catalyst will control the reaction speed and accommodate differing formulations within the process. For instance, a 10% decrease in the coating formula will extend the reaction time by 20 seconds. A similar increase will cause the reaction time to decrease by 10-15 seconds. Nonetheless the critical events to control in Zone A, for the coating, are to achieve proper flow of the coating onto the film, a surface wetting of the glass and initiation of the skinning reaction against the mold. At the core, the events to control in Zone A are to ensure an even flow of core reactants, a wetting of the lower glass mat and a conforming of the coating against the mold are required. More particularly, the low viscosity coating wets at least the continuous glass strands and to penetrate the toward the chopped glass.

In Zone B, the foam reacts fully to fill the mold. If the foam does not rise sufficiently within this time, holes, soft spots, and voids are experienced. There is also a consequent loss of dimensional control. If the foam rises too much, the foam may roll back upon itself and separating the molds to produce excess flashing. This increases the power required to pull the composite through the machine. Under excess conditions, excessive foaming may result in stalling of the molds 40, 42.

The desired density, the cream time, the gel time, and the rate of rise are controlled in Zone B through conventional urethane chemistry. Basic to this control is the metering of the blowing agent, catalysts and isocyanates. Too much core blow or not enough core blow in Zone B can change the product dimensions. The proper blowing is achieved by controlling (1) the water to blowing catalyst ratio to the excess isocyanate and (2) the relationship of the flow of core onto the belt, and (3) belt speed. The ratio of water and catalyst is also controlled to achieve the desired small uniform cells. If the water to catalyst ratio is unbalanced, the part will fill the mold, but the cells will be too large, resulting in decreased compressive and flexure strength.

Inasmuch as the blowing agent comprises water, the variation in the water absorbed on the raw materials is a critical variable. As water is about 5,000 times more reactive than the polyurethane such that small changes in absorbed moisture will significantly change the blowing conditions. The absorbed water is primarily dependent on environmental conditions and accordingly constantly changing in response thereto. While calcium carbonate is a desirable filler for economic reasons, its moisture content is widely variable, ranging from about 0.1%. to 0.5% at ambient conditions. This requires formulation adjustment to compensate for these changes. The requisite adjustments may be accomplished by adjusting the overall formulation such that the absorbed moisture is used as the blowing agent with the balance of the required water being supplementally supplied through the meters.

Control as to the water content of the formulation is achieved by monitoring the hardness of the parts exiting the machine as well as the dimensions thereof. If the overall absorbed moisture decreases for constant supplemental water, the blow decrease and the effect is noted by dimensional change. In this event, additional water and catalyst must be added to return the product to specification. This is accomplished by adjusting the meters to bleed additional water and catalyst thereby establishing the correct ratio. While the overall component specifications are established during product development to provide a set of desirable properties in the end product, the catalyst nonetheless must be adjusted so that the molded product will skin immediately and become hardened before exiting the machine such that the final dimensions are thereby constrained at the exit end. In Zone C, the reactants are partially cured resulting in a rigid coating, and a hardened foam Which is tack free and rigid, such that the composite 10 is complete and ready for for the severing operation, with dimensional stability. Final curing is effected in storage.

It is extremely important to ensure that a chemical bond and not merely an adhesive bond is formed at the glass interface. This requires that the coating be in the reaction or tacky phase during the foaming such that the core will react with it. Thus the core should foam just prior to skin setting and not significantly before or after.

With further regard to the interface, the amount of chopped glass is important inasmuch as it defines a structural boundary and the modulus of the product. Too much chopped glass will permit the core to foam to one side and the skin to set at the other side, with little or no chemical bonding therebetween. The failure mode reveals unwetted chopped glass. Too little glass, on the other hand, will allow the chopped glass to contact the strand glass making it the interface. In accordance with the present invention, the strongest products are made when the coating has time to wet the strand glass and lock some of the chopped glass into the skin showing that the skin has been partially formed before the core and that as the core rises to meet the skin it has incorporated a portion therewithin.

In order to keep the weight per foot constant, fill the molds and perform as aforementioned in each zone, the formulations are dynamically changed to compensate for the variations in materials. This is well known based on the various materials in contact with the isocyanate and the hydroxal numbers associated therewith.

As previously discussed, fillers such as calcium carbonate may contain absorbed moisture which functions as a blowing agent in addition to the injected water. Unless the material is dried beforehand, compensation must be made by dynamically changing the water, the isocyanate level and the catalyst level.

Such dynamic control is critical to the proper operation of the process. In other words, batch mixing of all the components may in certain instances yield acceptable product, but steady state product quality is difficult if not impossible to achieve. Batching in reality allows process control only through belt speed, mold temperature, and the isocynate/polyol ratio.

Various modifications of the above-described embodiment will be apparent to those skilled in the art. Accordingly, the scope of the invention is defined only by the accompanying claims.

What is claimed:

1. A reinforced polymeric composite, comprising: a foam core of a first polymeric composition; a skin surrounding said core of a second polymeric composition; a three dimensional interface chemically and mechanically bonding said core to said skin comprising strands of a high modulus material including continuous longitudinal strands substantially uniformly peripherally spaced about the outer surface of said core and the inner surface of said skin, continuous transverse strands substantially uniformly spaced along the length of said core adjacent to said longitudinal strands, a transverse layer of first chopped strands randomly contacting said longitudinal strands and said transverse strands, and second chopped strands inclined with respect to said core.

2. The composite recited in claim 1 wherein third chopped strands are randomly dispersed within said core.

3. The composite recited in claim 2 wherein said third chopped strands have a length of around one inch to two and one half inch.

4. The composite recited in claim 1 wherein said first polymeric composition is formed by a reactant mixture of a non-volatile liquid monomer, a surfactant and a catalytic system.

5. The composite recited in claim 4 wherein said non-volatile liquid monomer is selected from the group consisting of polyurethanes, polyesters, polyamide, epoxies and acrylics.

6. The composite recited in claim 1 wherein said first and second chopped strands are deposited between about 0.02 pounds per square foot and 0.88 pounds per square foot.

7. The composite recited in claim 1 wherein said first polymeric composition comprises a rigid polyol composition including a reactant mixture of a polyol and isocyanate together with sufficient catalyst to effect a rigid skin upon curing.

8. The composite recited in claim 1 wherein said second polymeric composition comprises a polyol, a filler, a blowing agent and catalyst in sufficient proportions to effect a rigid foam composition upon curing.

* * * * *